(12) United States Patent
Tomita et al.

(10) Patent No.: US 10,449,863 B2
(45) Date of Patent: Oct. 22, 2019

(54) REGENERATIVE BRAKE CONTROL DEVICE

(71) Applicant: MITSUBISHI JIDOSHA KOGYO KABUSHIKI KAISHA, Tokyo (JP)

(72) Inventors: Yoshinori Tomita, Tokyo (JP); Ryo Shimizu, Tokyo (JP); Norihiko Ikoma, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/760,448

(22) PCT Filed: Sep. 13, 2016

(86) PCT No.: PCT/JP2016/004153
§ 371 (c)(1),
(2) Date: Mar. 15, 2018

(87) PCT Pub. No.: WO2017/047071
PCT Pub. Date: Mar. 23, 2017

(65) Prior Publication Data
US 2018/0257491 A1    Sep. 13, 2018

(30) Foreign Application Priority Data
Sep. 16, 2015 (JP) ................... 2015-183172

(51) Int. Cl.
*B60L 7/18* (2006.01)
*B60L 7/24* (2006.01)
(Continued)

(52) U.S. Cl.
CPC ............... *B60L 7/18* (2013.01); *B60L 7/24* (2013.01); *B60L 15/2009* (2013.01); *B60T 8/17* (2013.01);
(Continued)

(58) Field of Classification Search
CPC ........ B60L 7/18; B60L 17/24; B60L 15/2009; B60T 8/17; B60T 8/171; B60T 8/172; B60T 2270/60; B60T 2220/04
(Continued)

(56) References Cited

U.S. PATENT DOCUMENTS 9,669,834 B2 *   6/2017   Ikedaya ............... B60W 10/18
10,106,039 B2 * 10/2018   Mizui .................. B60L 7/14
(Continued)

FOREIGN PATENT DOCUMENTS

| EP | 2810811 A1 | 12/2014 |
|----|------------|---------|
| EP | 2823985 A1 | 1/2015 |
| JP | 3541646 B2 | 7/2004 |

OTHER PUBLICATIONS

Extended European Search Report dated Apr. 4, 2019 for European Application No. 16845945.1.

*Primary Examiner* — Yazan A Soofi
(74) *Attorney, Agent, or Firm* — Birch, Stewart, Kolasch & Birch, LLP (57) ABSTRACT

Provided is a regenerative coordination brake control device that reduces the frequency of switching regenerative braking between a restricted state, in which regenerative braking is prohibited or suppressed, and a restriction removed state, in which the restriction on regenerative braking is removed. A regenerative coordination brake control device 91 includes a regeneration restriction condition determiner 92, which outputs a regeneration restriction signal Si when determining that a restriction condition for prohibiting or suppressing regenerative braking is met, an acceleration operation detector 93, which outputs a regeneration restriction removal signal S2 when detecting an acceleration of the vehicle, and a regeneration restriction removal determiner 94, which determines whether a restriction on regenerative braking of the vehicle that is in the restricted state is to be continuously (Continued)

imposed or removed using the regeneration restriction removal signal S2 and the regeneration restriction signal S1.

7 Claims, 4 Drawing Sheets

(51) Int. Cl.
    *B60T 8/171*     (2006.01)
    *B60T 8/172*     (2006.01)
    *B60T 8/17*     (2006.01)
    *B60L 15/20*     (2006.01)

(52) U.S. Cl.
    CPC .............. *B60T 8/171* (2013.01); *B60T 8/172* (2013.01); *B60L 2240/12* (2013.01); *B60L 2250/26* (2013.01); *B60T 2220/04* (2013.01); *B60T 2270/60* (2013.01); *Y02T 10/7275* (2013.01)

(58) Field of Classification Search
    USPC .......................................................... 701/70
    See application file for complete search history.

(56) References Cited

U.S. PATENT DOCUMENTS

| | | | |
|---|---|---|---|
| 2015/0032353 A1* | 1/2015 | Ajiro | B60L 50/16 701/70 |
| 2015/0191089 A1* | 7/2015 | Yamamoto | B60L 7/18 701/22 |
| 2015/0203106 A1* | 7/2015 | Zhao | B60L 7/18 701/22 |
| 2015/0217741 A1* | 8/2015 | Kikawa | B60L 7/18 701/71 |
| 2016/0207515 A1* | 7/2016 | Foitzik | B60T 13/745 |
| 2017/0087992 A1* | 3/2017 | Murase | B60L 7/18 |
| 2018/0056790 A1* | 3/2018 | Symanow | B60L 50/61 |
| 2018/0170386 A1* | 6/2018 | Jung | B60L 7/18 |

* cited by examiner

REGENERATIVE BRAKE CONTROL DEVICE

TECHNICAL FIELD

The present invention relates to a regenerative brake control device.

BACKGROUND ART

Examples of a braking system for a hybrid car or an electric vehicle that have been known include a braking system including a friction braking force generator, which generates a friction braking force by pressing a brake pad, and a regenerative braking force generator, which generates a regenerative braking force with regenerative power of a motor (see, for example, PTL 1).

Such a braking system includes a regenerative brake control device, which controls braking by calculating a required friction braking force and regenerative braking force from the total braking force required by a driver.

Conceivable examples of a structure including such a regenerative brake control device include a structure that switches regenerative braking between a restricted state, in which regenerative braking is prohibited or suppressed, and a restriction removed state, in which the restriction on regenerative braking is removed, in accordance with the vehicle operation state, such as during the operation of an anti-lock braking system (ABS).

CITATION LIST

Patent Literature

PTL 1: Japanese Patent No. 3541646

SUMMARY OF INVENTION

Technical Problem

However, frequently switching regenerative braking between the restricted state, in which regenerative braking is prohibited or suppressed, and the restriction removed state, in which the restriction on regenerative braking is removed, can highly probably degrade the driving performance due to a loss of braking or excessive braking.

The present invention has been made in view of the above problem, and aims to provide a regenerative coordination brake control device that less frequently switches regenerative braking between the restricted state, in which regenerative braking is prohibited or suppressed, and the restriction removed state, in which the restriction on regenerative braking is removed.

Solution to Problem

A regenerative brake control device according to the present invention is a regenerative brake control device that controls a regenerative braking force generator of a vehicle. The regenerative brake control device includes a regeneration restriction condition determiner, which outputs a regeneration restriction signal when determining that a regeneration restriction condition for prohibiting or suppressing regenerative braking is met, an acceleration operation detector, which outputs a regeneration restriction removal signal when detecting an acceleration operation of the vehicle, and a regeneration restriction removal determiner, which determines whether a restriction on regenerative braking of the vehicle that is in a restricted state is to be continuously imposed or removed using the regeneration restriction signal and the regeneration restriction removal signal. To determine whether regenerative braking of the vehicle in the restricted state due to the regeneration restriction signal is to be released from the restriction, the regeneration restriction removal determiner determines that the restriction on regenerative braking of the vehicle is to be continuously imposed even without an output of the regeneration restriction signal, and the regeneration restriction removal determiner determines that the restriction on regenerative braking is to be removed on condition that the regeneration restriction removal signal is output.

Advantageous Effects of Invention

The present invention can provide a regenerative coordination brake control device that less frequently switches regenerative braking between a restricted state, in which regenerative braking is prohibited or suppressed, and a restriction removed state, in which the restriction on regenerative braking is removed.

DESCRIPTION OF EMBODIMENTS

Figure 1:
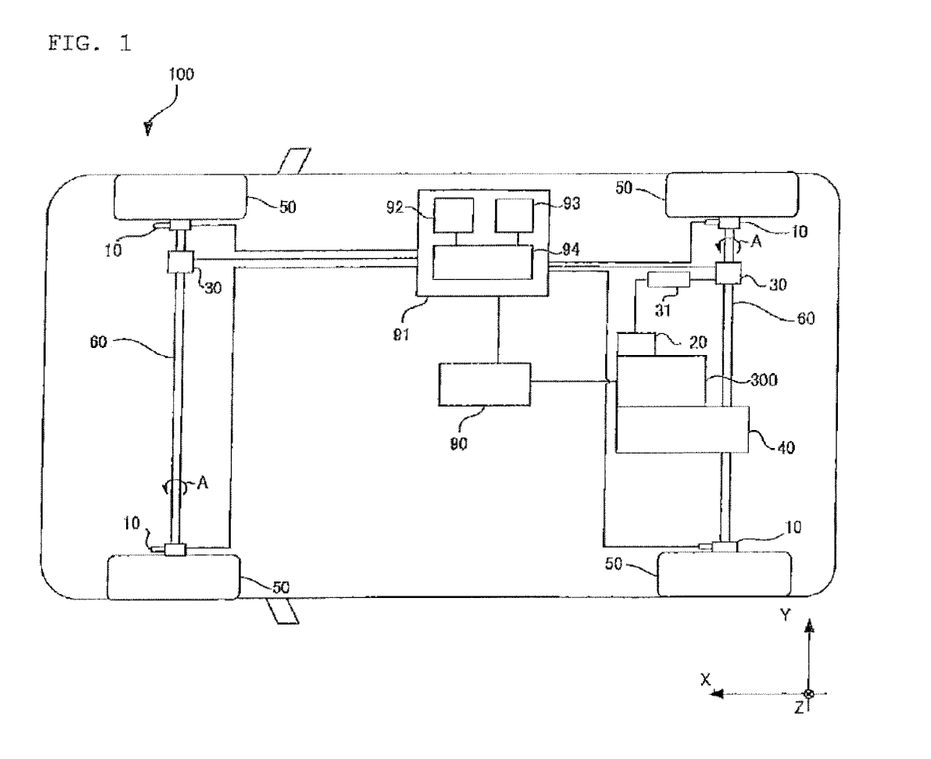
FIG. 1 illustrates an example of the entire structure of a vehicle according to a first embodiment of the present invention.

As illustrated in FIG. 1, a vehicle 100 including a regenerative coordination brake control device is described below as a first embodiment of the present invention.

The vehicle 100 includes an engine 300, serving as a driving source, four tires 50, disposed in a lower portion of the vehicle 100 to support the vehicle 100, and axles 60, having their ends attached to the tires 50 to transmit motive power from the engine 300 to the tires 50.

The vehicle 100 includes hydraulic brakes 10, which serve as friction braking force generators that apply friction to the tires 50 or the axles 60 to cause a friction braking force, a motor 20, which converts electric power to motive power to assist the engine 300, and a battery 31, which supplies electric power to the motor 20.

The vehicle 100 includes a regenerative brake 30, which serves as a regenerative braking force generator that regenerates motive power of rotation of the axles 60 and coverts it into electric power, and a transmission 40, which transmits the driving force generated by the engine 300 to the axles 60.

The vehicle 100 includes an ECU 90, which serves as a controller that controls the entirety of the vehicle 100, and a regenerative cooperation ECU 91, which serves as a regenerative coordination brake control device that is electrically connected to the ECU 90 to control the hydraulic brakes 10 and the regenerative brake 30 so that they work in cooperation.

The present embodiment describes the vehicle 100 having a structure in which a driving force is transmitted to the left and right rear tires 50 and the vehicle 100 moves in an X direction. However, the vehicle 100 may be driven in any type including front-wheel drive, rear-wheel drive, and four-wheel drive.

In the present embodiment, the vehicle 100 is a hybrid car including the motor 20 and the engine 300 as driving sources. However, the vehicle 100 may have a structure only including the motor 20, such as a so-called electric vehicle, as a driving source.

In the present embodiment, the regenerative cooperation ECU 91 is described as a unit separate from the ECU 90, but may be part of the function of the ECU 90.

The two axles 60 are arranged side by side in the Y direction, which is a vehicle-width direction of the vehicle 100. The axles 60 are drive shafts extending in an X direction, which is a front-rear direction of the vehicle 100, and rotate in an A direction with the operation of the engine 300.

The tires 50 are pneumatic rubber tires. The tires 50 are filled with air of a predetermined pressure.

The battery 31 serves as a storage battery that stores electric power regenerated by the regenerative brake 30 while allowing the electric power to be supplied to the motor 20. The battery 31 also serves as an electric power storage that stores electric power supplied from the outside of the vehicle 100.

The ECU 90 is a controller that performs controlling on the basis of information acquired from each component of the vehicle 100, such as an amount by which a driver operates the brake pedal or an accelerator pedal.

Figure 2:
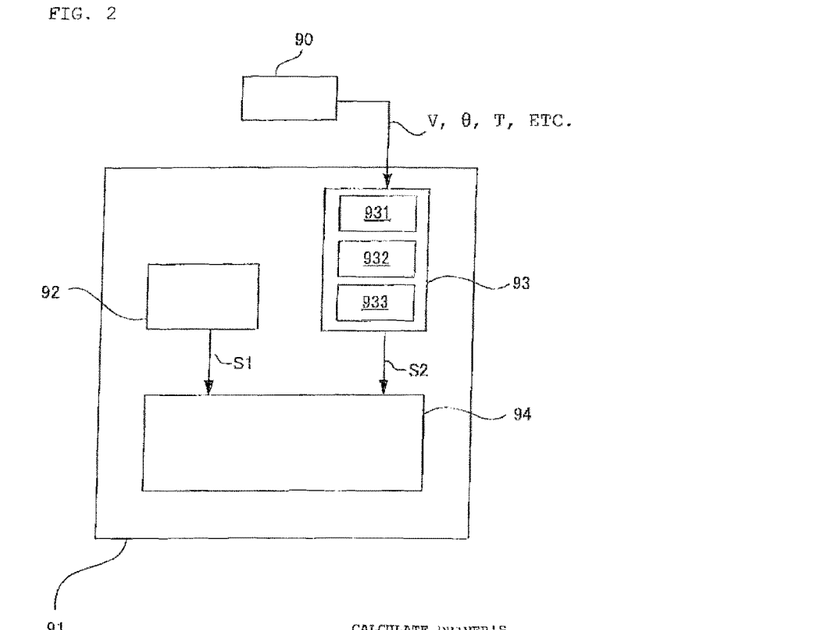
FIG. 2 is a schematic diagram of an example of a configuration of the regenerative coordination brake control device illustrated in FIG. 1.

As illustrated in FIG. 2, the regenerative cooperation ECU 91 includes a prohibition condition determiner 92, serving as a regeneration restriction condition determiner that outputs a regeneration restriction signal S1 when determining that restriction conditions for prohibiting or suppressing regenerative braking, as listed in Table 1 described below, are met.

The regenerative cooperation ECU 91 includes an acceleration operation detector 93, which serves as an acceleration operation detector that outputs a regeneration restriction removal signal S2 when detecting an acceleration operation of the vehicle 100.

The regenerative cooperation ECU 91 includes a regeneration prohibited state determiner 94, which serves as a regeneration restriction removal determiner that determines whether regenerative braking of the vehicle 100 that is under restriction is to be continuously restricted or released from the restriction using the prohibition condition determiner 92 and the acceleration operation detector 93, that is, on the basis of the regeneration restriction signal S1 and the regeneration restriction removal signal S2.

The regeneration restriction signal S1 and the regeneration restriction removal signal S2 are both digital signals representing True or False, that is, values of 1 or 0. That the prohibition condition determiner 92 outputs the regeneration restriction signal S1 represents that the regeneration restriction signal S1 is 1, that is, the regeneration restriction signal S1 is True. The same holds true for the regeneration restriction removal signal S2.

The present embodiment describes a case where the regenerative braking is switched between a prohibited state and an enabled state. Alternatively, a so-called restricted state in which regenerative braking is prohibited or suppressed, and a restriction removed state in which the restriction is removed, may be switched between each other.

The acceleration operation detector 93 includes an accelerator position detector 931, which detects an accelerator position θ, which is an amount by which the accelerator is operated by a driver of the vehicle 100, and a vehicle speed detector 932, which detects the vehicle speed V of the vehicle 100 output from the ECU 90.

The acceleration operation detector 93 includes a torque calculator 933, which calculates a driver's requiring torque T from the accelerator position θ.

The acceleration operation detector 93 outputs the regeneration restriction removal signal S2 on condition that the accelerator position θ, the vehicle speed V, and the driver's requiring torque T are respectively greater than or equal to predetermined values $θ_1$, $V_1$, and $T_1$.

The accelerator position θ detected by the accelerator position detector 931, the vehicle speed V detected by the vehicle speed detector 932, and the driver's requiring torque T calculated by the torque calculator 933 reach or exceed the predetermined values as a result of the driver accelerating the vehicle 100.

Specifically, the acceleration operation detector 93 outputs the regeneration restriction removal signal S2 when detecting an acceleration operation of the driver on the basis of information output from the ECU 90.

In consideration of an acceleration intention, described below, information used to determine the existence of such an acceleration operation, that is, whether the regeneration restriction removal signal S2 is to be output preferably includes at least the accelerator position θ among the accelerator position θ, the vehicle speed V, and the driver's requiring torque T.

In the present embodiment, such an acceleration operation or the driver's operation on the accelerator pedal is input to the regenerative cooperation ECU 91 through the ECU 90. However, the acceleration operation may be directly input to the regenerative cooperation ECU 91.

As described below, the regeneration prohibited state determiner 94 determines that regenerative braking is not the state requiring prohibition, on condition that the regeneration restriction signal S1 is not output and the regeneration restriction removal signal S2 is output.

This point is described in detail.

As described below, in the regeneration prohibited state in which the regenerative brake 30 is prohibited from performing regenerative braking, preferably, frequent switching of operations of the regenerative brake 30 is to be avoided, and the regeneration prohibited state is to be removed when the regeneration prohibited conditions are not met.

Figure 5:
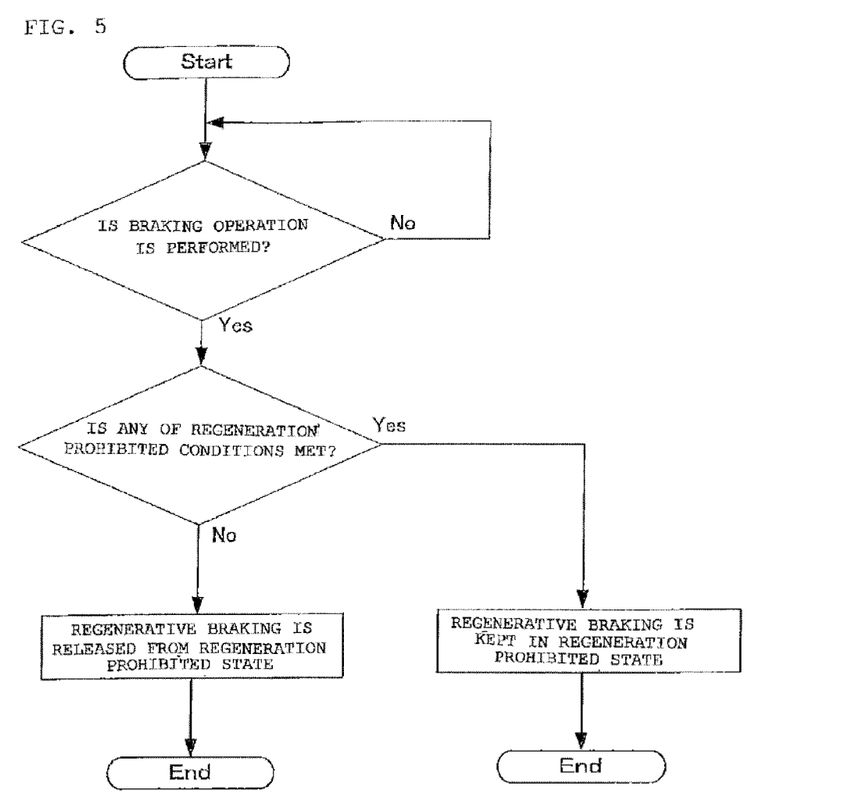
FIG. 5 illustrates an example of an operation of a regenerative coordination brake control device according to a comparative example, compared with the present invention, in the regeneration prohibited state.

For example, as illustrated in FIG. 5 as a comparative example, the following describes a structure that switches regenerative braking between the regeneration prohibited state and the regeneration prohibition removed state, on the basis of whether any of the regeneration prohibited conditions is met, that is, only on the basis of whether the regeneration restriction signal S1 is on or off.

However, such a structure that determines whether regenerative braking is in the regeneration prohibited state or the regeneration prohibition removed state every time the brake pedal is operated may frequently switch regenerative braking between the regeneration prohibited state and the regeneration prohibition removed state when, for example, a driver intermittently depresses the brake pedal.

To avoid such frequent switching, it is important for the regenerative cooperation ECU 91 to correctly determine whether the driver is to accelerate the vehicle or decelerate or stop the vehicle.

In other words, preferably, the regeneration prohibited state determiner 94 switches regenerative braking between the regeneration prohibited state and the regeneration prohibition removed state in consideration of a driver's acceleration intention.

In the present embodiment, the acceleration operation detector 93 outputs the regeneration restriction removal signal S2 when detecting an acceleration operation of the driver. Specifically, the regeneration restriction removal signal S2 can be said as being a parameter representing the driver's acceleration intention to accelerate the vehicle.

Thus, in the present embodiment, the regeneration prohibited state determiner 94 determines that regenerative braking is not in the state requiring prohibition, on condition that the regeneration restriction signal S1 is not output and the regeneration restriction removal signal S2 is output. Based on this determination, the regenerative cooperation ECU 91 cancels the regeneration prohibited state.

Figure 3:
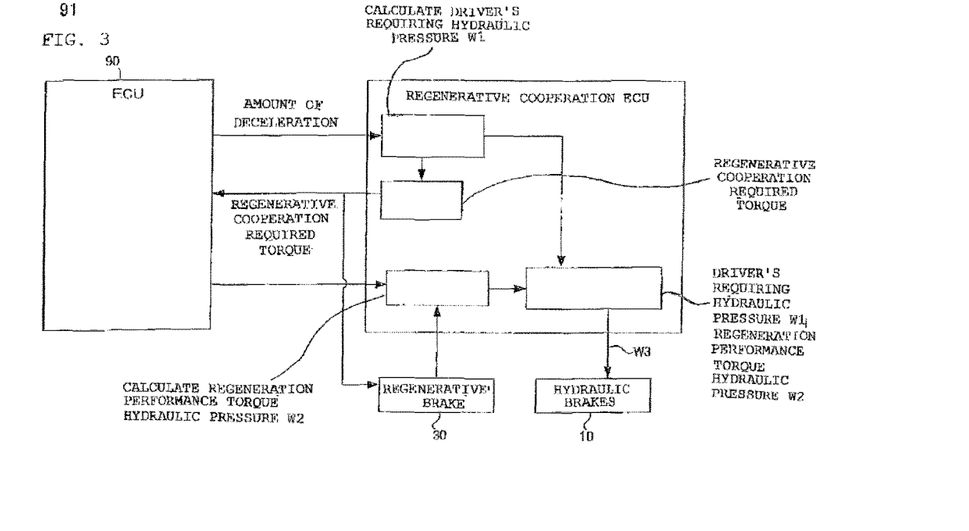
FIG. 3 is a schematic diagram of an example of a regenerative control operation of the regenerative coordination brake control device illustrated in FIG. 1 during normal running.

A regenerative cooperation control of the vehicle 100 having the above structure in the normal running state is described with reference to FIG. 3.

When the ECU 90 detects that the driver has operated the brake pedal of the vehicle 100 to decelerate the vehicle 100, the ECU 90 calculates the amount of deceleration required by the driver on the basis of the amount by which the brake pedal is depressed, and outputs the calculated amount to the regenerative cooperation ECU 91.

The regenerative cooperation ECU 91 calculates a driver's requiring hydraulic pressure W1, which is an intended braking force converted into the hydraulic pressure of the hydraulic brakes 10, on the basis of the amount of deceleration received from the ECU 90.

The regenerative cooperation ECU 91 calculates, from the operation state of the vehicle 100, such as the number of revolutions of the motor 20 or the charged state of the battery 31, the regenerative braking force caused when the regenerative brake 30 is operated, and outputs the regenerative cooperation required torque, which is a feasible predicted value, to the ECU 90 and the regenerative brake 30.

The regenerative brake 30 outputs a regenerative braking force actually caused through the operation of the regenerative brake 30, that is, a regeneration performance torque, which is an actual regenerative cooperation torque, to the regenerative cooperation ECU 91.

The regenerative cooperation ECU 91 converts the regeneration performance torque into a regeneration performance torque hydraulic pressure W2. The regeneration performance torque hydraulic pressure W2 is obtained by converting the regenerative braking force equivalent to the regeneration performance torque into a hydraulic pressure required to perform braking using the hydraulic brakes 10.

The regenerative cooperation ECU 91 outputs a difference between the regeneration performance torque hydraulic pressure W2 and the driver's requiring hydraulic pressure W1 to the hydraulic brakes 10 as a S/C target hydraulic pressure W3, which is a friction braking force.

Thus, the regenerative cooperation ECU 91 controls the regenerative brake 30 and the hydraulic brakes 10 so that the sum of the regenerative braking force generated by the regenerative brake 30 and the friction braking force generated by the hydraulic brakes 10 equals the target braking force.

Preferably, the regenerative cooperation ECU 91 that controls the regenerative braking force renders the regenerative braking force as zero under the conditions listed in Table 1. Specifically, when any of regenerative prohibited conditions listed in Table 1 as regenerative cooperation prohibited conditions is met, the regenerative cooperation ECU 91 stops the operation of the regenerative brake 30.

However, preferably, the frequent switching of the operation of the regenerative brake 30 is to be avoided since the regenerative braking force responds more quickly than the friction braking force. In other words, the operation of the hydraulic brakes 10 may fail to catch up with frequent switching of the regenerative brake 30, which may degrade the driving performance due to a loss of braking or excessive braking.

Specifically, if the regeneration prohibited conditions are met as a result of the driver performing deceleration, the sum of the friction braking force of the hydraulic brakes 10 and the regenerative braking force of the regenerative brake 30 may deviate from the target braking force.

TABLE 1

| No. | Regeneration Prohibited Conditions | Reasons |
| --- | --- | --- |
| 1 | When SOC is high (nearly fully charged) | Advantage of regenerative cooperation is small due to extremely small input to battery. To prevent degradation of battery. |
| 2 | When battery has extremely low temperature or high temperature | To prevent temperature rise of battery due to extremely small input to battery |
| 3 | While voltage or current FB is in operation | Due to sudden change of motor regenerative torque |
| 4 | When driving motor has high temperature | To reduce load on motor |
| 5 | When CAN communication is abnormal | Due to unreliable torque requirement |
| 6 | When ESB-ECU is abnormal | Same as above |
| 7 | When shift lever is positioned in P range or N range | To prevent wrong operation in P range, or because of shut down in N range |
| 8 | When shift lever is positioned in R range | Due to no prospect of fuel economy improvement |
| 9 | In fail-safe | Input to battery is limited |

Thus, preferably, the regeneration prohibited state is to be continuously imposed when any of the regeneration prohibited conditions is met, that is, while the regeneration restriction signal S1 is output.

On the other hand, simply prohibiting regenerative braking would degrade fuel economy.

In the present embodiment, the driver's acceleration intention is used to determine whether regenerative braking is to be switched between the regeneration prohibited state, in which regenerative braking is to be prohibited, and the regeneration prohibition removed state, in which regenerative braking is not prohibited. Thus, regenerative braking is less frequently switched between the regeneration prohibited state and the regeneration prohibition removed state to prevent degradation of the driving performance.

Figure 4:
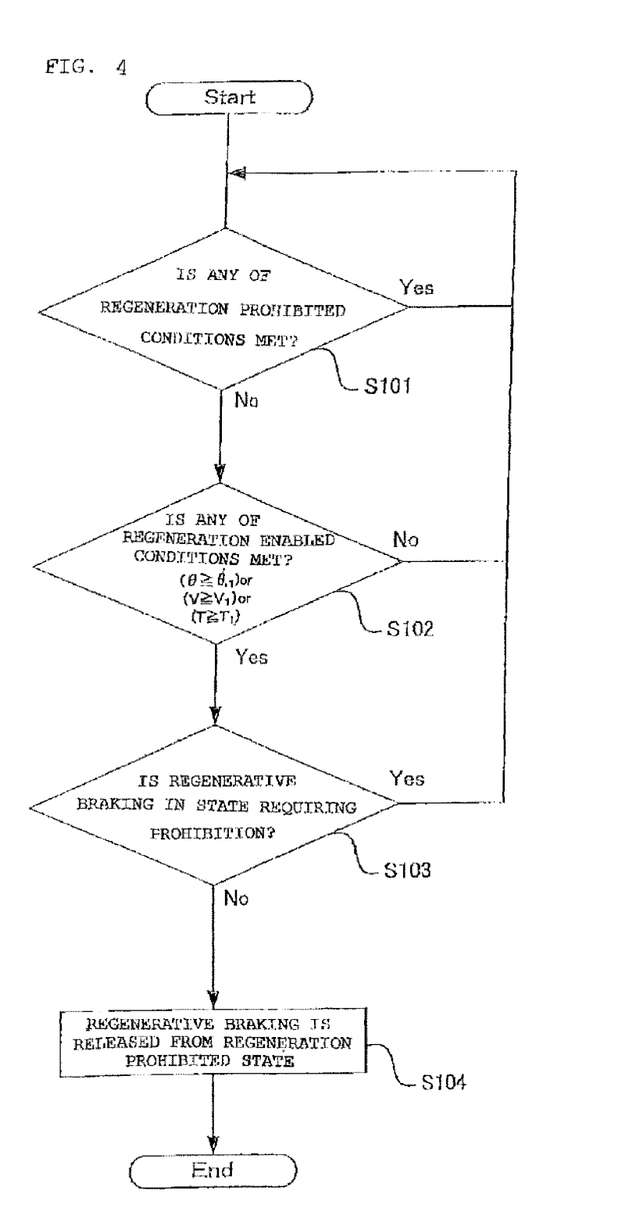
FIG. 4 is a flowchart showing an example of an operation of the regenerative coordination brake control device illustrated in FIG. 1 in a regeneration prohibited state.

FIG. 4 illustrates a flowchart representing switching between the regeneration prohibited state according to the present embodiment, in which regenerative braking is to be prohibited, and the regeneration prohibition removed state, in which regenerative braking is not be prohibited.

This flowchart shows the flow from the regeneration prohibited state as the beginning, then switched to the regeneration prohibition removed state, and then to the normal running.

Firstly, the regenerative cooperation ECU 91 determines that any of the regeneration prohibited conditions listed in Table 1 is met (step S101). In other words, step S101 is a prohibited condition determination step to switch regenerative braking to the regeneration prohibited state or to keep regenerative braking in the regeneration prohibited state, on condition that the regeneration restriction signal S1 is output.

When it is determined in the prohibited condition determination step that any of the regeneration prohibited conditions is met, the regeneration prohibited state is kept until all the regeneration prohibited conditions are removed.

When none of the regeneration prohibited conditions is met, the regenerative cooperation ECU 91 determines that any of regeneration enabled conditions is met (step S102). Step S102 is a regeneration enabled condition determination step, which is an acceleration intention determination step for determining the existence of a driver's acceleration intention by detecting an acceleration operation with, for example, a driver's accelerator operation, that is, on condition that the acceleration operation detector 93 has output the regeneration restriction removal signal S2.

On condition that the regeneration restriction signal S1 is not output and the regeneration restriction removal signal S2 is output, the regeneration prohibited state determiner 94 determines that regenerative braking is not in the state requiring prohibition (step S103). Specifically, step S103 is a regeneration prohibited state determination step for determining whether regenerative braking is in the state requiring prohibition.

When it is determined in step S103 that regenerative braking is not in the state requiring prohibition, the regenerative cooperation ECU 91 switches regenerative braking from the regeneration prohibited state to the regeneration prohibition removed state (step S104).

When the regenerative cooperation ECU 91 has switched regenerative braking to the regeneration prohibition removed state, as described above, the vehicle 100 is controlled in accordance with the operation of the regenerative cooperation ECU 91 in the normal running state.

In the present embodiment, the regenerative cooperation ECU 91 includes the prohibition condition determiner 92, which determines that any of the regeneration prohibited conditions is met and outputs the regeneration restriction signal S1, and the acceleration operation detector 93, which detects an acceleration operation of the vehicle 100 and outputs the regeneration restriction removal signal S2.

The regenerative cooperation ECU 91 includes the regeneration prohibited state determiner 94, which determines whether regenerative braking is in the state requiring prohibition, using the prohibition condition determiner 92 and the acceleration operation detector 93.

The regeneration prohibited state determiner 94 determines that regenerative braking is not in the state requiring prohibition, on condition that the regeneration restriction signal S1 is not output and the regeneration restriction removal signal S2 is output.

This structure reduces the frequency of switching regenerative braking between the state requiring prohibition and the state not requiring prohibition.

In the present embodiment, the regeneration prohibited state determiner 94 cancels prohibition of regenerative braking in the regeneration prohibited state when the regeneration restriction signal S1 is not output and the regeneration restriction removal signal S2 is output.

In this structure, a driver's acceleration intention is used to determine whether regenerative braking is to be switched between the regeneration prohibited state requiring prohibition and the regeneration prohibition removed state not requiring prohibition. Thus, regenerative braking is less frequently switched between the regeneration prohibited state and the regeneration prohibition removed state to suppress degradation of the driving performance.

In the present embodiment, the acceleration operation detector 93 includes the accelerator position detector 931, which detects the accelerator position $\theta$ operated by the driver of the vehicle 100. The acceleration operation detector 93 outputs the regeneration restriction removal signal S2 on condition that the accelerator position $\theta$ is greater than or equal to the predetermined value $\theta_1$.

In this structure, a driver's acceleration intention is used to determine whether regenerative braking is to be switched between the regeneration prohibited state requiring prohibition and the regeneration prohibition removed state not requiring prohibition. Thus, regenerative braking is less frequently switched between the regeneration prohibited state and the regeneration prohibition removed state to suppress degradation of the driving performance.

In the present embodiment, the acceleration operation detector 93 includes the vehicle speed detector 932, which detects the vehicle speed V of the vehicle 100. The acceleration operation detector 93 outputs the regeneration restriction removal signal S2 on condition that the vehicle speed V is greater than or equal to the predetermined value $V_1$.

In this structure, a driver's acceleration intention is used to determine whether regenerative braking is to be switched between the regeneration prohibited state requiring prohibition and the regeneration prohibition removed state not requiring prohibition. Thus, regenerative braking is less frequently switched between the regeneration prohibited state and the regeneration prohibition removed state to suppress degradation of the driving performance.

In the present embodiment, the acceleration operation detector 93 includes the torque calculator 933, which calculates the driver's requiring torque T from the accelerator position $\theta$. The acceleration operation detector 93 outputs the regeneration restriction removal signal S2 on condition that the driver's requiring torque T is greater than or equal to the predetermined value $T_1$.

In this structure, a driver's acceleration intention is used to determine whether regenerative braking is to be switched between the regeneration prohibited state requiring prohibition and the regeneration prohibition removed state not requiring prohibition. Thus, regenerative braking is less frequently switched between the regeneration prohibited state and the regeneration prohibition removed state to suppress degradation of the driving performance.

Preferred embodiments of the present invention have been described thus far. The present invention, however, is not limited to the specific embodiments. Unless otherwise specified in the above description, the embodiments may be modified or changed in various manners within the scope of the gist of the present invention described in the scope of claims.

For example, in the embodiments, the acceleration operation detector detects an acceleration operation using the accelerator position, the vehicle speed, and the driver's requiring torque. The structure is not limited to the above structure, and may be any structure that detects an acceleration operation using other indexes reflecting a driver's acceleration intention.

In the embodiments, the vehicle includes an internal combustion engine besides a motor. However, the vehicle may be an electric vehicle including only a motor as a motive power source.

In that case, preferably, the vehicle includes another electric power source such as a battery.

The effects described in the embodiments of the present invention are only the most preferable ones arising from the present invention. The effects of the present invention are not limited to those described in the embodiments of the present invention.

REFERENCE SIGNS LIST 10 friction braking force generator (hydraulic brake)
20 motor
30 regenerative braking force generator (regenerative brake)
50 tire
90 ECU
91 regenerative coordination brake control device (regenerative cooperation ECU)
92 prohibition condition determiner (prohibition condition determiner)
93 acceleration operation detector (acceleration detector)
94 regeneration restriction removal determiner (regeneration prohibited state determiner)
100 vehicle
300 engine
931 accelerator position detector
932 vehicle speed detector
933 torque calculator
A rotation direction
S1 regeneration restriction signal
S2 regeneration restriction removal signal
T driver's requiring torque
θ amount of accelerator operation (accelerator position)
V vehicle speed
X vehicle-width direction
Y travel direction (front-rear direction)

The invention claimed is:

1. A regenerative brake control device that controls a regenerative braking force generator of a vehicle, comprising:
 a controller and a storage medium storing a program that causes the controller to:
  output a regeneration restriction signal when determining that a regeneration restriction condition for prohibiting or suppressing regenerative braking is met; and
  determine whether a restriction on regenerative braking of the vehicle that is in a restricted state is to be continuously imposed or removed using the regeneration restriction signal and the regeneration restriction removal signal; and
 an acceleration operation detector, which outputs a regeneration restriction removal signal when a driver's intention to accelerate the vehicle is detected; and
 wherein, to determine whether regenerative braking of the vehicle in the restricted state due to the regeneration restriction signal is to be released from the restriction, the program causes the controller to determine that the restriction on regenerative braking of the vehicle is to be continuously imposed even without an output of the regeneration restriction signal, and determine that the restriction on regenerative braking is to be removed on condition that the regeneration restriction removal signal is output.

2. The regenerative brake control device according to claim 1,
 wherein the program further causes the controller to release the regenerative braking from the restriction when the controller determines that the restriction on regenerative braking is to be removed.

3. The regenerative brake control device according to claim 1,
 wherein the acceleration operation detector includes an accelerator position detector, which detects an amount of an accelerator operation performed by a driver of the vehicle, and the acceleration operation detector outputs the regeneration restriction removal signal on condition that the amount of the accelerator operation is greater than or equal to a predetermined value.

4. The regenerative brake control device according to claim 3, further comprising:
 a vehicle speed detector, which detects a speed of the vehicle,
 wherein the program further causes the controller to remove the restriction on regenerative braking when the controller determines that the restriction on regenerative braking is to be removed and the vehicle speed is greater than or equal to a predetermined value.

5. The regenerative brake control device according to claim 3,
 wherein the acceleration operation detector includes a torque calculator, which calculates a driver's requiring torque from the amount of the accelerator operation, and the acceleration operation detector outputs the regeneration restriction removal signal on condition that the driver's requiring torque is greater than or equal to a predetermined value.

6. The regenerative brake control device according to claim 2,
 wherein the acceleration operation detector includes an accelerator position detector, which detects an amount of an accelerator operation performed by a driver of the vehicle, and the acceleration operation detector outputs the regeneration restriction removal signal on condition that the amount of the accelerator operation is greater than or equal to a predetermined value.

7. The regenerative brake control device according to claim 4,
 wherein the acceleration operation detector includes a torque calculator, which calculates a driver's requiring torque from the amount of the accelerator operation, and the acceleration operation detector outputs the regeneration restriction removal signal on condition that the driver's requiring torque is greater than or equal to a predetermined value.

* * * * *